Oct. 4, 1938.  A. HOYT  2,131,738
OPTICAL SYSTEM
Filed March 30, 1936  3 Sheets-Sheet 1
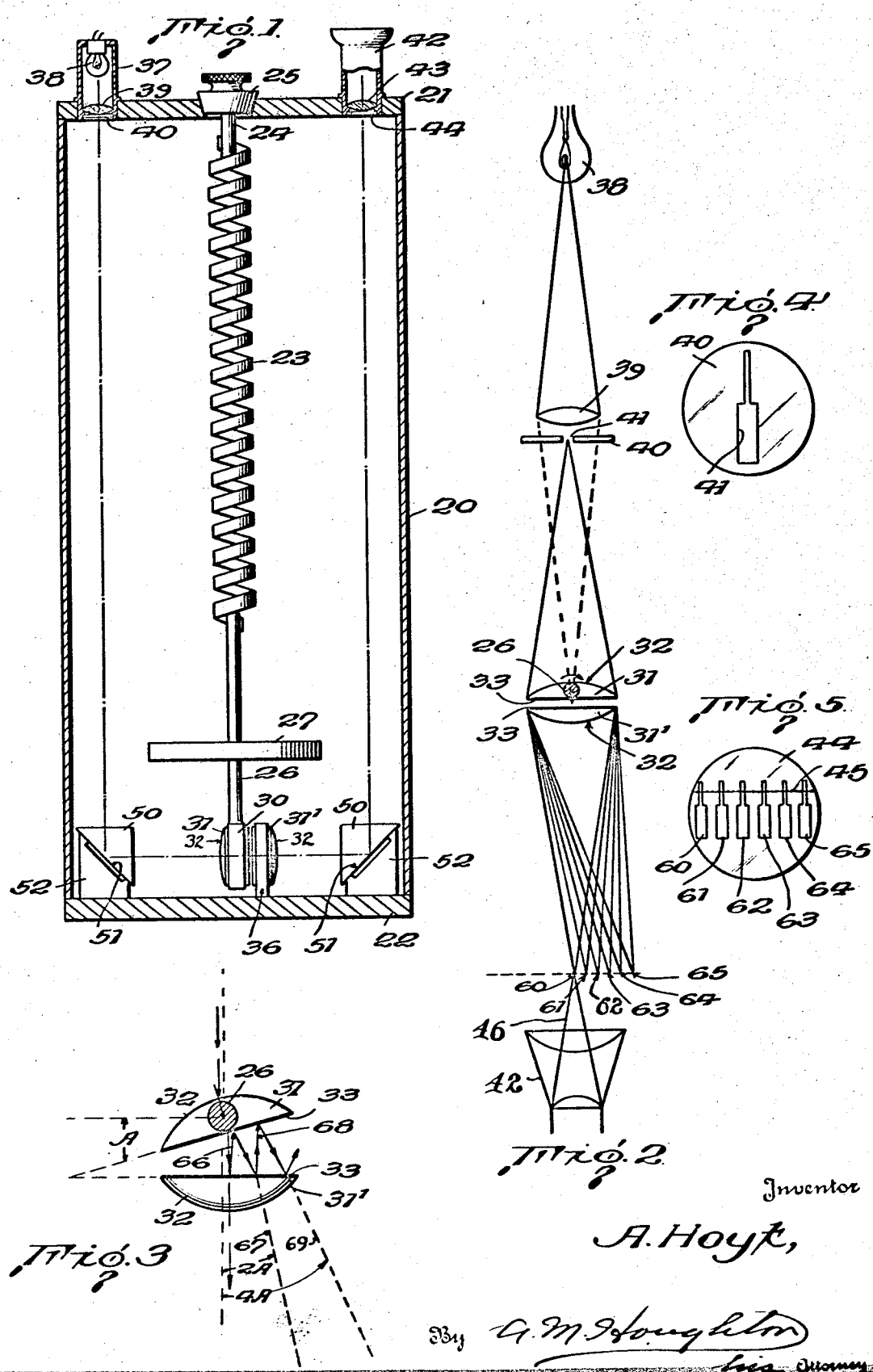
Inventor
A. Hoyt,
By G. M. Houghton Oct. 4, 1938.　　　　　　　A. HOYT　　　　　　2,131,738
OPTICAL SYSTEM
Filed March 30, 1936　　　3 Sheets-Sheet 2
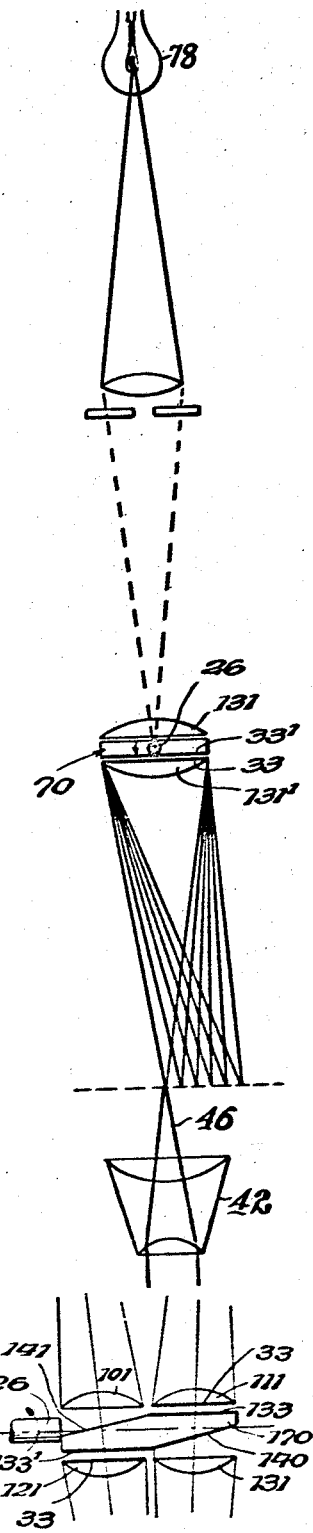
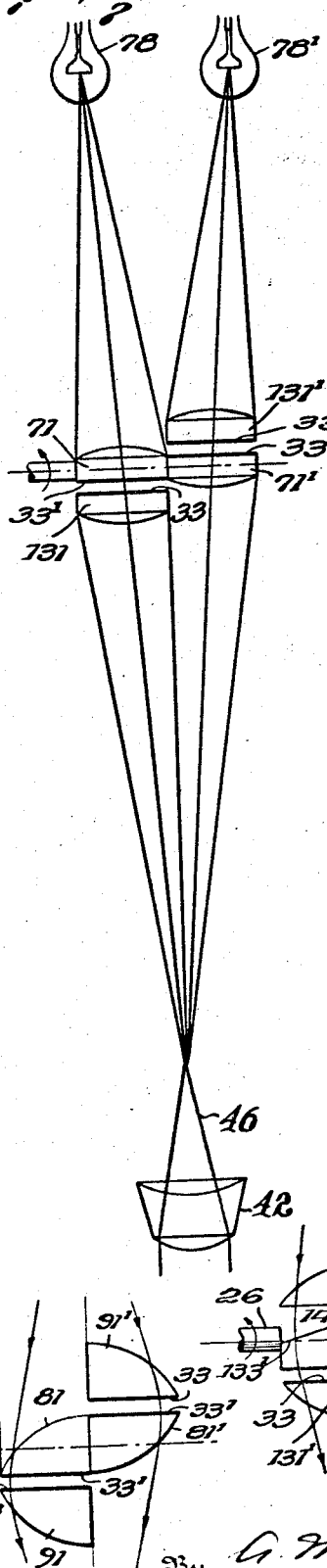
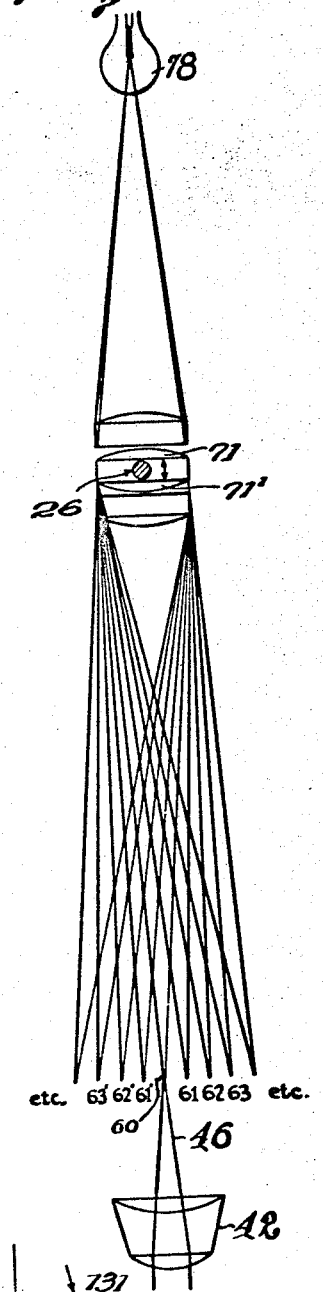
Inventor
A. Hoyt,
By G. M. Houghlm
his Attorney

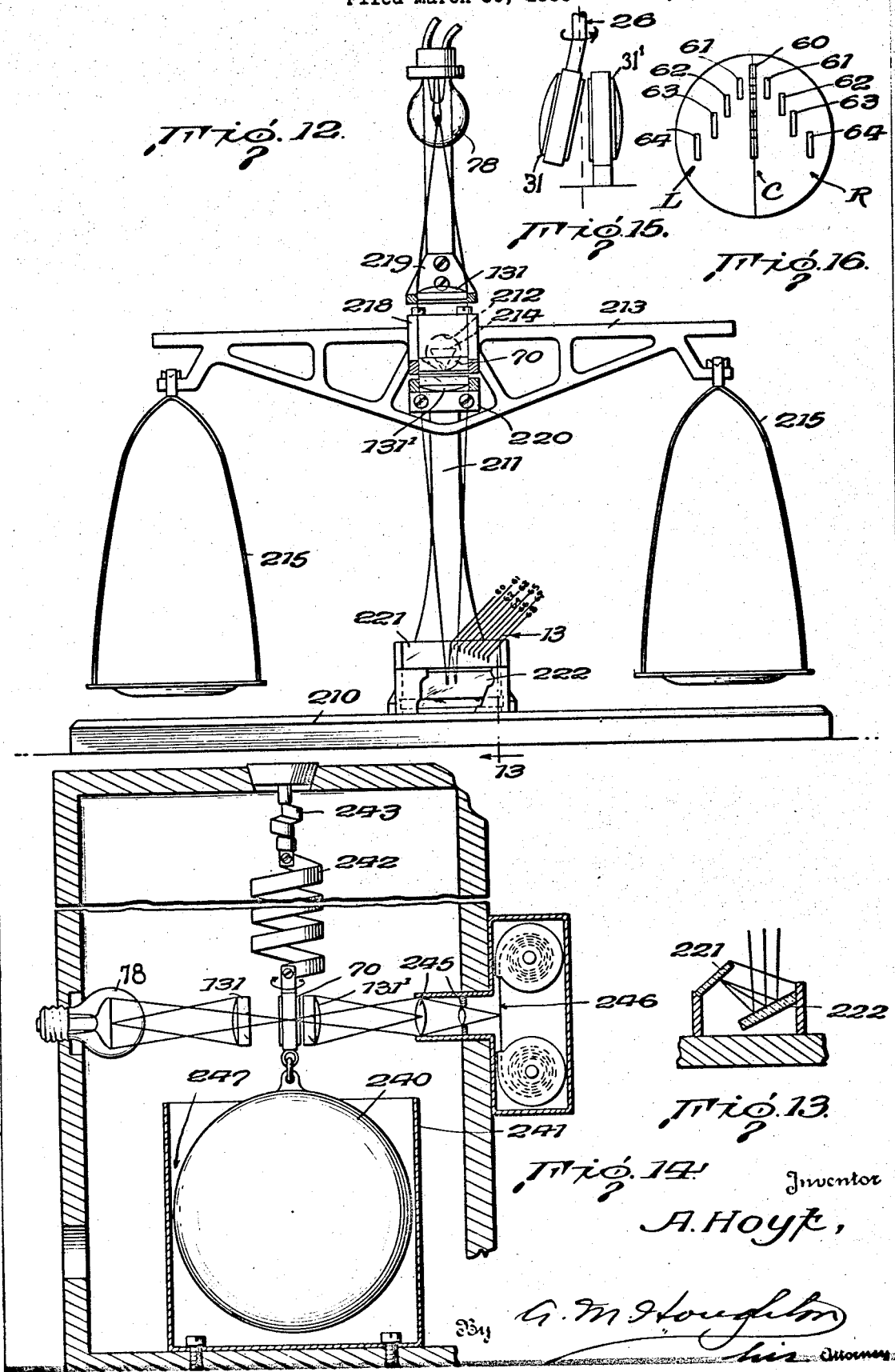

Patented Oct. 4, 1938

2,131,738

UNITED STATES PATENT OFFICE 2,131,738

OPTICAL SYSTEM

Archer Hoyt, Aspinwall, Pa., assignor to Gulf Research & Development Company, Pittsburgh, Pa., a corporation of Delaware Application March 30, 1936, Serial No. 71,737

11 Claims. (Cl. 88—24)

This invention relates to optical systems; and it comprises optical means for indicating angular deflection of an angularly movable apparatus part, comprising a pair of plane, partially transparent mirrors arranged substantially parallel to each other, one mirror being fixed and one attached to said apparatus part, so that upon movement of said part the mirror attached thereto is tilted with respect to the fixed mirror, a source of light, means for directing a collimated beam of light from the source through the mirrors substantially at right angles to the plane of the mirrors, and means for bringing the collimated beam to a focus at a focal plane after its passage through the mirrors, so that upon movement of the apparatus part, inter-reflections occur between the mirrors and a series of images of the source is formed at the focal plane; all as more fully hereinafter set forth and as claimed.

Many physical measuring instruments indicate the measurement as an angular deflection. For example, there has been developed a gravimeter, an apparatus for measuring the force of gravity at any given point on the surface of the earth, which indicates changes in gravity as an angular deflection of a portion of the apparatus.

In instruments where the angular deflection is large or where great sensitivity is not required the deflection may be indicated by a simple needle or pointer attached to the moving part. In more delicate instruments it is usual to employ in lieu of a metal pointer, a so-called light beam pointer. That is, a mirror is attached to the moving part, and arranged to reflect a beam of light from a fixed source to a fixed screen. Upon any twisting of the moving part, a spot of light moves over the screen. This arrangement presents advantages over material pointers in that the pointer is merely a beam of light which has no mass or friction; and also that the angular deflection indication is, through optical lever effect, amplified by a factor of 2. However, this single reflection arrangement, while an improvement upon mechanical pointers, has limitations. To secure great sensitivity it has been found necessary to employ light-paths six feet long or more, which makes for a bulky and cumbersome apparatus.

One object of the invention is to provide an optical indicating system which utilizes a light beam as a pointer but which gives an enhanced amplification of the angular deflection.

Another object is the provision of an optical indicating system which is of great compactness.

Another object is the provision of such a system utilizing multiple reflections to secure amplification and in which the exact order of reflection used is apparent to the observer.

Another object is the provision of such a system adapted for measurement of very small angular deflections.

Another object is to provide an optical system which is very sensitive but which is rugged, easy to adjust, and capable of being operated by unskilled persons.

These objects are achieved by the provision of an optical indicating system which includes, essentially, a projection lens combination and two partially transparent mirrors at or near the center of the combination, one of the mirrors being fixed and the other moving. The mirrors may be combined with the lenses or may be separate elements. The moving mirror is attached to some angularly-deflectable part of the measuring apparatus to which the system is applied. A source of light and a screen are set up in such manner that the source is imaged on the screen by the lens combination. Then upon angular deflection of the moving element, a series of multiple reflection images appears on the screen, each of which images indicates the actual angular deflection multiplied by a different factor. The principles of operation will be clear in the extended description to follow.

The new system will be described in three typical adaptations: to a gravimeter, an analytical balance and a barograph. Two principal modifications of the system itself will be described, to illustrate the invention. Examples of specific embodiments of the invention are illustrated in the accompanying drawings, in which Fig. 1 is a simplified view, partly in elevation and partly in vertical section, of one embodiment of the invention incorporated in a gravimeter;

Fig. 2 is a diagrammatic view of the optical system of Fig. 1;

Fig. 3 is an optical diagram illustrating the operation of the optical system of Figs. 1 and 2;

Fig. 4 shows an advantageous form of slit;

Fig. 5 shows what is seen in the eyepiece when the slit of Fig. 4 is used;

Fig. 6 is an optical diagram of a modification of the system shown in Fig. 2;

Figs. 7 and 8 are diagrammatic views in two different directions, of a modified form of optical system;

Figs. 9, 10 and 11 show modified forms of lens combinations;

Fig. 12 shows an analytical balance incorporating the optical system;

Fig. 13 is a fragmentary sectional view of a portion of Fig. 12;

Fig. 14 shows a barograph incorporating the optical system;

Fig. 15 shows a modification giving echelon images; and

Fig. 16 shows the image array with the system of Fig. 15.

In the showings, in which like reference characters indicate like parts throughout, Fig. 1 shows one embodiment incorporated in a loaded-spring gravimeter. The gravimeter, of which the showing is simplified, comprises a casing 20 with top 21 and base 22. A helical coil spring 23 is provided, being suspended from the casing top by a post 24 and angularly-adjustable plug 25, and having attached to its lower end a post 26 carrying an annular weight 27. The spring is of a type adjusted to twist under the influence of variations in weight of the annulus 27, and hence to impart a twisting movement to post 26, reflecting changes in the earth's gravity. The twist is in all cases of very small magnitude, making special indicating means advisable for securing accuracy. The gravimeter, including the spring, is described in detail in my copending application Serial No. 34,824, filed August 5, 1935.

The optical system of the present invention is used to indicate angular deflections of post 26. As shown, there is affixed to post 26 an annular mount 30 retaining a lens-mirror 31 having a convex unsilvered face 32 and a plane face partly silvered as at 33 forming a mirror. A similar lens-mirror 31' having corresponding faces 32 and 33 is mounted on the base (22) by means of an annular mount 36. The lenses are ordinarily made of glass, though they can be made of other transparent material if desired. The plane faces 33 of the lenses are parallel, in the normal or zero position of the apparatus. If necessary knob 25 is adjusted to bring the faces into parallelism. The plane faces are arranged closely adjacent. In top 21 is attached a housing 37 containing a light bulb 38, a condensing lens 39 and a slit element 40 (Fig. 4) having a slit 41. The slit member can be of the adjustable type if desired and can be of shape other than that shown. Also mounted in the top is an eyepiece 42 including a lens 43 and a transparent screen member 44 (Fig. 5) having a scale 45. In Figs. 2 and 6, 7 and 8 the eyepiece is indicated diagrammatically at 42, the appropriate image ray lines for one of the images (the undeflected image) being indicated at 46. In lieu of a screen and scale, the observing means may comprise a micrometer eyepiece with crosshairs, or ocular observing means may be replaced by recording means such as a piece of photographic material (described post). The term screen is used herein to include the focal plane of the eyepiece and any sort of index or receiving surface, upon which the indicating images are focused.

In lieu of a slit, a narrow linear lamp filament or a point source can be used, as described post. Two 45 degree prisms 50 having reflecting hypotenuse faces 51 are mounted on the base in supports 52. The function of the prisms is to direct light from the slit through the lenses and back up to the eyepiece.

The operation of the optical system is best seen in Fig. 2, which shows the several elements thereof, except the prisms, which are omitted since their only function is to change direction of the light beams. The image of the filament of bulb 38 is focused between lenses 31 and 31' and thus the slit is illuminated substantially uniformly. The illuminated slit serves as the effective source of light for the system. The lenses, slit and scale are so arranged that the slit is imaged on the scale, as shown. In all embodiments of the invention it is provided that the light beam in the inter-lens space is collimated; i. e., the rays are parallel. In the arrangement of Fig. 2 this condition is achieved by placing the scale and the slit at the principal foci of the lens combination. When the lenses are parallel the slit is imaged on the scale at 60. This is the normal or zero position of the post 26 system. Upon angular deflection of the post 26 the lenses are put out of parallel. Inter-reflections between the plane mirror faces occur, the phenomenon being diagrammed in Fig. 3. Each inter-reflected bundle of rays gives rise to an image on the screen, as indicated at 61, 62, 63, 64 and 65. A large number of reflection images are produced; only five are shown. The appearance of the screen and scale in the eyepiece is indicated in Fig. 5, the undeviated direct image (60) and the higher order images appearing as shown.

In all cases the moving lens should be so mounted on the post that the nodal axis of the lens coincides, or approximately coincides, with the axis of rotation. In plano-convex lenses such as those shown, the nodal axis is tangent to the plane face, and the plane face is shown as not far from tangency to the axis of rotation. This adjustment is not especially important when the angles measured are small.

The axis of rotation being tangent or nearly so to the nodal axis of the lens, then for small angles the direct image is undeviated upon angular displacement of post 26 and serves as a reference point. But each of the images due to inter-reflections represents the angular displacement of post 26, angularly amplified by a factor depending on the number of inter-reflections responsible for that image. Thus the first inter-reflection noted at 66 on Fig. 3 gives rise to a ray 67 which produces image 61 and which makes an angle 2A equal to twice the angle A through which post 26 moves. The second inter-reflection noted at 68 gives rise to a ray 69 which produces image 62 and which makes an angle 4A. Higher orders of inter-reflections give rise to rays making an angle which is equal to the angle of deflection of post 26 multiplied by twice the number of reflections. That is, the $n$th image from the undeflected image moves through an angle $2nA$ when post 26 moves through an angle A. In Fig. 3 all the angles are shown exaggerated for the sake of clarity.

The observer may select any of the images. For example, he may select the 6th image, and note that the scale reading is 15 millimeters from the zero image to the 6th image. Scale readings are sufficient for most purposes, but if desired the actual angular deflection of the post can be calculated by trigonometry; in which case a scale value of 15/12 or 1.25 is taken as corresponding to the actual angular deflection. To find this angle (in radians) one divides 1.25 by the lens focal length in millimeters.

Since one ray is undeviated, and since the higher order images extend from it in spaced series, there is no ambiguity as to which order of reflection the observer is utilizing. He merely counts from the undeflected image. This is an important feature of my system. In making use of multiple reflections for indicating, it is desirable that there should be no ambiguity as to which order of reflection the observed image belongs.

While the system described is, in principle, operable even when the plane faces of the lenses are unsilvered, since plain glass surfaces reflect light to a certain extent (about 4 per cent of the total incident light at normal incidence), in practice best results are secured when the plane faces are made of higher reflecting power as by applying a very thin partially transmitting mirror film of aluminum, silver or other metal thereo. The transmission and reflection factors have a certain optimum value depending upon which order of reflected image is to be used. The following are the considerations by which the silvering to be applied to the plane faces is determined.

Reference to Fig. 3 shows that to get $n$ reflections from a moving mirror (where $n$ means any integral number, e. g., 1, 2, 3, etc.), there must be $n$ other reflections taken from a fixed mirror; also, that in the case of all images due to interreflection, transmission through two and only two mirror surfaces must occur. Thus to get maximum intensity in the $n$th reflection, the mirror surfaces should be highly reflecting and only slightly transparent because there are $2n$ reflections but in all cases only 2 transmissions.

The reflection and transmission characteristics of the opposed plane faces may be different, but since experience shows that it is best to have the reflection and transmission factors of the two mirror-faces equal, only this case need be discussed in detail.

The intensity of the $n$th reflection $I_n$, depends on $2n$ reflections but on only 2 transmissions. If the transmission of each mirror surface is $t$, then the reflection factor is $(1-t)$ and the intensity can be represented as $$I_n = I_0 t^2 (1-t)^{2n}$$

where $I_0$ is the incident light intensity. By known calculation methods it is determined that this function has a maximum value for $n$, expressed as follows:

$$t(\text{maximum}) = 1/(n+1)$$

Thus in the case of the $n$th reflection the maximum possible light intensity is obtained when the transmission factor is $t=1/(n+1)$. For example, using the 6th image, the optimum transmission factor is 1/7. Using the 10th image it is 1/11; in other words the transmission is 9 per cent.

Experience shows that on the whole the best practical results with the system are obtained when about the 10th order reflection image is used, the angular amplification in this case being 10 times that obtainable if only a single reflection were used. In this case a transmission of 9 per cent is, as stated, optimum, but results almost as good (image intensity not less than 90 per cent of optimum) can be abtained with transmission within the range 12.5 and 6.3 per cent.

I regard aluminum alloy films as best for the mirrors, by reason of their excellent optical properties and their durability, but other materials, such as silver, can be used. The term "silvered" is used herein to include all suitable reflecting films, metallic or non-metallic.

Fig. 4 shows the slit as of greater width at one end than the other. While ordinary linear slits can be used, the form illustrated is advantageous in that the enlarged end provides some stray light which makes the scale or crosshairs readily visible.

The embodiment of the invention described is the simplest and is in many adaptations the most useful. The system is readily adaptable to all sorts of measuring instruments, the movable lens being in all cases affixed to an angularly movable part of the apparatus. Certain modifications of the apparatus have utility in particular installations. Some of these are exemplified in Figs. 6-11.

The embodiment just described, and all other embodiments of the invention, have two partly transparent mirror faces and a projecting lens combination. The minimum number of optical components, therefore, is four; two mirror facings and two lenses. These parts can be provided as individual optical parts or as combined optical parts, i. e., the mirror facing being on the lens, subject to a few simple restrictions. It is best to have the reflecting faces close together and the light being multiply reflected back and forth between the mirrors should be essentially "parallel light". The lenses can be double convex, positive meniscus, or plano-convex; that is, of any converging type. The lenses can be simple or highly corrected. The mirrors should be high quality optical flats and partly transparent. The mirror films can be mounted on glass, quartz or other suitable backing. Since every air-glass interface imposes a 4 per cent (approximately) loss of light intensity, there is some advantage in combining the functions of the optical parts. While it is not necessary to take great pains to conserve light intensity, a general simplification results in that fewer mechanical mountings are required if the lenses are made plano-convex and the plane side is used for the mirror backing as well as just for the other side of a lens. Carried to the limit, the system then consists of two plano-convex lens-mirror units requiring only two mounts (Figs. 1-3). This system is ideal if one lens mirror is fixed and the other mounted on a moving part with a well defined axis. If, however, small translational displacements of the lens mirror occur, there will result small changes in the optic axis of the system. For use on portable instruments, such as a gravimeter which has to be leveled for each new station, the system shown in Fig. 6 presents advantages.

Fig. 6 shows a system similar to that of Fig. 2 but having two fixed plano-convex lenses 131 and 131', one of which (advantageously the one on the eyepiece side) has a partially silvered plane mirror face 33, and a parallel plane-faced glass element 70 is arranged therebetween, element 70 being affixed to an angularly movable part (26) of the measuring apparatus. The face 33' of element 70 adjacent face 33 is silvered. Element 70 is thus an angularly movable mirror. This arrangement gives results similar to those obtained with the device of Fig. 2.

The embodiment of Fig. 6, I regard as being on the whole the most useful system. The disassociation of the moving mirror from the lens on the source side of the system results in a simplification of the manipulations involved in the initial adjustment of the system. The system is especially useful in gravimeters of the type indicated in Fig. 1. Since the optical part attached to the moving system is essentially a plane-parallel piece of glass with a mirror surface on the eyepiece side, there occurs no shift of the optic axis of the system of the moving element which swings due to seismic disturbances, or is slightly misalined due to errors in leveling. In the Fig. 6 system, errors due to a lens not rotating about its nodal point are avoided. This system possesses all the advantages of a system with four completely disassociated optical elements with the added advantage of one less mechanical mounting, since the mounting for the fixed mirror is likewise the mounting for the lens on the eyepiece side of the system.

The lenses of Figs. 1 to 3 and 6 can be of the same focal length or different. If different, the image of the slit will be magnified or minified depending on the ratio of focal lengths. This is sometimes advantageous.

While the systems described are sufficiently sensitive, even for very delicate apparatus, it is possible to secure twice the sensitivity by making use of a modification, which is essentially a double system so constructed that two equal and opposite series of images are produced upon angular deflection of the apparatus. Readings are taken between the $n$th image of each series.

One such modification is shown in Fig. 7 (elevation) and Fig. 8 (plan). Two plano-convex lens combinations 71 and 71', are fixed to the angularly movable apparatus element in the alinement shown, and these are opposed to two fixed lenses 131 and 131' as shown. Plane faces 33' of lenses 71 and 71', and plane faces 33 of lenses 131 and 131', are silvered to serve as mirrors. This modification is shown as having line-filament lamps 78 and 78' in lieu of the lamp-lens slit combination of Figs. 1, 2 and 6. The various elements are arranged so that the primary filament images of the two systems coincide on the screen, as at 60. To achieve this result in this modification, lens 131 is of slightly shorter focal length than lens 71, and lens 71' is of slightly longer focal length than lens 131. If desired lens 131' can be of the same focal length as lens 71, provided lamp 78' is set back to bring it at the principal focus of lens 131'.

Upon angular deflection of the apparatus element, a double series of images is produced as shown in Fig. 8. The series on the right of the reference point (60) is denoted by 61, 62, etc., and that on the left is denoted by 61', 62', etc.

Measurement is conveniently made between the 10th image of each series. The sensitivity of this device is just twice that of the devices of Figs. 2 and 6 having similar dimensions, because, when post 26 is rotated, the two sets of images move in opposite directions with respect to the central image. This causes the images to move through twice the distance in the field of view.

The moving element (lenses 71 and 71') can be made by simply mounting two such lenses in a mount, or it can be made by cementing two thin plano-convex lenses to a flat piece of glass.

Figs. 9, 10 and 11 show optional forms of lens combinations which achieve similar results.

Fig. 9 shows a combination of four half-lenses, the moving lens comprising oppositely disposed half-lenses 81 and 81' as shown, and two fixed lenses 91 and 91' being provided. This arrangement gives results similar to those achieved with the device of Figs. 7 and 8, but only one light source is necessary. In using this embodiment a lamp-lens-slit assemblage as in Fig. 2 can be used, and the appearance of the image array is as in Fig. 8. Lens 91' has a slightly shorter focus than lens 81, and lens 81' has a slightly longer focus than lens 91, to image the source properly. The plane faces 33 of lenses 91 and 91', and faces 33' of lenses 81 and 81', are partially silvered to provide plane mirrors of semicircular shape on the opposed faces as shown.

Fig. 10 shows an arrangement of four fixed lenses, 101, 111, 121 and 131, and a movable element consisting of a parallelogram-shaped glass block or double prism 170 with partially transmitting plane mirror faces 133 and 131' opposed parallel to lenses 111 and 121, and beveled, unsilvered faces 140 and 141. The operation of this device is similar to that of Fig. 6. The reason for beveling faces 140 and 141 is to make them not parallel with respect to faces 33 of lenses 111 and 121; if they were parallel, spurious and disturbing reflection images might appear. The angle of bevel is slight, only a few degrees off of parallel being necessary to achieve the results. The bevel is exaggerated in the showing for the sake of clarity. In this arrangement a double lamp arrangement as in Fig. 7 is employed, and the aspect of the reflection images is as in Fig. 8. The modification of Fig. 10 has the advantage that all four lenses can be of the same focal length if desired. The prismatic element (170) is disposed so that the prisms bend the rays from the filament, in a direction along the length of the filament; thus no difficulties are introduced due to dispersion by the prisms. The image is not widened across its width, but across its length, which is of no importance.

Fig. 11 shows an arrangement analogous to Fig. 10 but having only two fixed lenses, 131 and 131', and a parallelogram discoid element 270. In some cases the bevel can be dispensed with entirely, element 270 taking the form of a plane discoid similar to that of the device of Fig. 6, but silvered in half-circles on opposite sides, rather than over the whole face of the disc on only one side as in Fig. 6. In such modification it is advantageous to have the moving element slightly canted, i. e., off parallel, in the zero position. The right half only of lens 131, and the left half only of lens 131', are silvered, as at 33, to provide mirrors. This system, which utilizes a single lens-slit combination as in Fig. 2, gives a double series of images as in Fig. 8.

These double-series systems are useful in instruments for measuring directly the tidal forces of the sun and moon, in which instruments extremely great sensitivity is essential.

Figs. 15 and 16 show a useful modification of the invention, which may be used with all embodiments but which is illustrated in connection with the system of Figs. 1 and 2. By mounting the movable mirror lens element (31) on post 26 in such manner that the plane of the mirror (33) makes an angle to the axis of rotation of the post, the multiple images produced on angular rotation of the post are no longer alined, but appear in the eyepiece in echelon arrangement as indicated at R in Fig. 16. When the post swings back to central position, the images appear overlapped in a line, as indicated at C in Fig. 16. As the post swings past center to the left, the images again appear as an echelon as indicated at L. Thus when the post is swinging, the appearance in the eyepiece is as of a movable brush or pointer swinging about a pivot at 60. With this arrangement it is very easy to observe when the images are alined (at C) hence this modification is useful in instruments based on the null principle. As the alined images partly overlap, there is less loss in light for any particular image.

In all embodiments of the invention the mirror faces of the various elements are advantageously disposed close together, and ordinarily the faces are parallel in the zero position.

The systems are shown as adapted for measuring deflections in one dimension only, but those of Figs. 2 and 6 can be readily adapted for indicating deflections in two dimensions, by substituting for the slit an illuminated pinhole aperture or other point source of light, and mounting the movable optical element on an apparatus element subject to angular motion in more than one plane. Such a modification is of particular utility in certain types of seismographs.

Figs. 12 and 13 illustrate the adaptation of the system of Fig. 6 to an analytical balance. The balance comprises the usual elements; a base 210, upright 211, knife edge support 212, beam 213, knife edge 214 and pans 215. The moving plate 70 of the optical system is affixed to the beam, in alinement with the knife edge, in a mount 218 as shown. The under side of plate 70 is silvered. Fixed lenses 131 and 131' are attached to the upright, as shown, in mounts 219 and 220. The upper side of lens 131' is silvered as described. A straight filament lamp 78 is provided as in Fig. 7. On the base are mounted an inclined scale-screen 221, of ground glass or Celluloid, and an inclined mirror 222 arranged to reflect the measuring beam on to the scale (Fig. 13). The operation of this device is similar to that of Fig. 6. The balance point is indicated by the series of images collapsing and coinciding. The optical system forms an extremely sensitive balance indicator for weighing apparatus.

Fig. 14 shows a recording barograph in which the optical system of the invention is incorporated. A light-weight float 240, consisting of a very thin blown glass shell filled with air under suitable pressure and hermetically sealed, is suspended inside a cylindrical shield 241 (to protect the shell from the effect of air currents and to provide air damping for the moving system) from a helical ribbon coil spring 242 arranged in a manner analogous to the gravimeter spring of Fig. 1. A small air gap 247 is left between the float and the shield as shown. The spring is shown as having a bimetallic temperature compensating section 243. Changes in atmospheric pressure cause the float to rise or fall, changing the length of the spring accordingly. The change in length is accompanied by twisting of the spring. The angular deflection is not great, but the optical indicating means are capable of accurately measuring it. The light source and lens combination is similar to that of Fig. 12, but in lieu of a scale there is shown a recording device comprising a cylindrical lens system 245 adapted, in cooperation with lenses 131 and 131', to form a point image of the lamp filament upon a moving tape 246 of sensitized film or paper. In operation, the tape is moved at uniform speed by suitable mechanism (not shown). Variations in atmospheric pressure are accompanied by twistings of the plate 70. A family of wavy curves is delineated on the moving tape, any one of which can be used as a basis of measurement. Should the curve used for measurement go off the tape due to a great variation in atmospheric pressure, one of the other curves can be selected for use in measurement at this point, the appropriate factor being applied.

It should be noted that the optical system provides indicating or recording means which impose no resistance upon the moving apparatus element. Indeed, the system has no mechanical connection whatever with the apparatus mechanism.

In an optical system of the present invention of sensitivity equal to that of an ordinary lamp-mirror-scale system, the light path is only $1/n$ as long, where $n$ is the order of reflection utilized. For example, in the system of Fig. 1 utilizing the 10th reflection, a total light path of 2 feet is equivalent to an ordinary system having the lamp and scale spaced 20 feet from the mirror. In a system as in Fig. 2 with a source-screen distance of 22 inches and using a $10x$ ocular, it was easy to measure angular deflections as small as 0.1 second of arc. In a system of similar dimensions but using only a single reflection, no angle less than 1 second can be measured with the same ease.

Using a straight line scale, deflections noted on the scale are practically a linear function of the angular deflection when the angular deflection is not more than a few degrees; the scale deflection being proportional to the tangent of the angular displacement. For larger ranges of deflections, a tangent correction can be applied arithmetically or, the scale can be curved about the center of the lens combination. For most installations the tangent correction can be neglected, as the total angular aperture of the eyepiece is less than 1 degree of arc.

To secure best results, in all cases the plane mirror surfaces should be finished optically flat to a high degree of precision. In ordinary lens and mirror practice, surfaces flat to within $\lambda/4$, where $\lambda$ is the wavelength of light with which the lens or mirror is used, are considered perfect; that is, when the maximum difference in level between the "hills and valleys" of the surface is within $\lambda/4$, it is considered unnecessary to work for further flatness. However, in mirrors for the present apparatus, the surfaces should be finished to a higher degree of accuracy, since the same area of the surface is used several times, and error is cumulative. For best results the surfaces should be flat to within $\lambda/n^{\frac{1}{2}}$, where $n$ is the order of reflection used. For example, using 10 reflections, the mirrors ideally should be flat to within $$\frac{\lambda}{12.6}$$

or about 0.00004 mm. for yellow sodium light (D line). However, many of the advantages of the invention are secured when the precision of workmanship is much lower than this. In practice $\lambda/10$ flats are used. This degree of accuracy is advisable only in the case of the surfaces between which multiple reflections occur. For other surfaces, such as the convex lens surfaces, conventional degrees of precision are sufficient.

Except as otherwise indicated, the usual considerations applying to optical systems in general apply here. For example, the ratio of aperture to focal length of the lenses determines the brightness of the reflection images; sensitivity is higher the higher the magnification of the ocular used, up to a certain limit; and the longer the light path (i. e., the longer the focal length of the lens combination) the higher is the sensitivity. The lenses can be corrected for aberrations in known ways; though this is rarely necessary. The light path can be bent as by the prisms of Fig. 1 in known ways to fit the system to different types of apparatus.

The apparatus in all its embodiments is easy to adjust, even by persons of limited technical skill. It is thus much more generally useful than interferometer indicating systems and similar devices which require a considerable degree of knowledge and skill for satisfactory operation. Moreover the systems embodied in properly constructed apparatus are rugged and do not tend to get out of adjustment. They are thus ideal for use in portable precision apparatus such as gravimeters.

What I claim is:

1. In measuring apparatus having an angularly deflectable member, optical means for giving a magnified indication of such deflection, comprising a pair of plane, partially transparent mirrors arranged substantially parallel to each other, one mirror being fixed and one being attached to said deflectable member so that upon the mirror deflection of the deflectable member the mirror attached thereto is moved out of parallelism with respect to the fixed mirror, a source of light, means for directing a collimated beam of light from said source through said mirrors in a direction substantially at right angles to the plane of the mirrors, and means for bringing said collimated beam to a focus at a focal plane after its passage through the mirrors, so that upon deflection of the deflectable member, inter-reflections occur between the mirrors and a series of images of the source is formed at the focal plane.

2. In measuring apparatus having an angularly deflectable member, optical means for giving a magnified indication of such deflection, comprising a pair of plane, partially transparent mirrors arranged closely adjacent and substantially parallel to each other, one mirror being fixed and one being attached to said deflectable member for motion therewith, so that upon deflection of the deflectable member the mirror attached thereto is moved out of parallelism with respect to the fixed mirror, a source of light, and a pair of converging lenses, one lens being on one side of the mirrors and at a distance from the source substantially equal to the principal focus of the lens, so that the lens directs a collimated beam of light through the mirrors, the second lens being on the other side of the mirrors and adapted to bring the collimated beam to a focus at a focal plane, so that upon deflection of the movable mirror, multiple reflections occur between the mirrors and a series of images of the source appears at the focal plane.

3. The optical system of claim 2 wherein the stationary mirror is carried on one of the lenses, and the other lens is attached to the deflectable apparatus member, and the other mirror is carried on said attached lens.

4. The optical system of claim 2 wherein both lenses are stationary, and the stationary mirror is carried on one of the lenses.

5. An optical system adapted to give a magnified optical indication of angular deflection of a mechanism part which is deflectable about an axis, comprising narrow light-emitting means, four partially transparent plane mirrors, two of said mirorrs being attached to the movable mechanism part, facing on opposite sides of the said axis and displaced from each other along the direction of the axis, two similar stationary mirrors each closely opposed to and facing one of said movable mirrors, and converging lens means on each side of said opposed pairs of mirrors, the lens means being so arranged as to collimate light from the source, pass it as a beam through the said pairs of mirrors and focus said beam at a focal plane after passage through the mirrors, whereby upon deflection of said movable mechanism part, multiple reflections of collimated light occur between the fixed mirrors and the movable mirrors, giving rise at said focal plane to a double series of images of the source of light.

6. An optical system adapted for indicating angular deflection of an angularly movable apparatus part, comprising two plano-convex lenses, a partially transparent mirror film on the plane face of each lens, one of said lenses being fixed and one being attached to said movable apparatus part, the lenses being arranged with said plane faces facing each other, a source of light and a screen, the source and the screen being arranged so that light from the source, is collimated by one of said lenses, is passed between said mirrors as a substantially collimated beam and is focused by the other lens on the screen.

7. An optical system adapted for indicating angular deflection of an angularly movable mechanism part, comprising two fixed plano-convex lenses the plane faces of which are disposed facing each other, a partially transparent mirror on one of said plane faces, a movable optical element positioned between said faces and having two plane faces each of which is opposed parallel to said lens plane faces, a second partially transparent mirror on one of said plane faces of the optical element adjacent the first mirror, said movable element being attached to said mechanism part, concentrated small-width means for emitting light and a screen, the light-emitting means and the screen being so arranged that light from the light-emitting means passes through the lenses and the movable element and is focused on the screen.

8. The optical system of claim 1 wherein the mirrors are very thin aluminum alloy films of such thickness as to transmit a small fraction of the light impinging thereon.

9. The apparatus of claim 1 wherein the source of light is an illuminated slit member, the slit being narrow at one end and wide at the other to provide stray light.

10. In measuring apparatus having a member angularly deflectable about an axis, optical means for giving a magnified indication of such deflection, comprising a pair of plane, partially transparent mirrors arranged closely adjacent each other, one being parallel to the axis and the other inclined at a small angle with respect to the axis, one mirror being attached to said deflectable member and the other being fixed, a small source of light, means for directing a collimated beam of light from the source through said mirrors and means for focusing the beam, after its passage through the mirrors, upon a focal plane, so that upon deflection of the deflectable member an echelon series of images of the source is formed at the focal plane.

11. The optical system of claim 1 wherein the transparency of each mirror is between 12.5 and 6.3 per cent, to secure an optimum image for the image corresponding to ten interreflections.

ARCHER HOYT.